US011865494B2

(12) United States Patent
Subra et al.

(10) Patent No.: US 11,865,494 B2
(45) Date of Patent: Jan. 9, 2024

(54) DEVICES, SYSTEMS, FACILITIES AND PROCESSES FOR BIO FERMENTATION BASED FACILITIES

(71) Applicant: NEXT CARBON SOLUTIONS, LLC, Houston, TX (US)

(72) Inventors: Vikrum Subra, Houston, TX (US); Ivan Van Der Walt, Conroe, TX (US); Connor Rivard, Houston, TX (US); Ben Heichelbech, Houston, TX (US)

(73) Assignee: NEXT CARBON SOLUTIONS, LLC, Houston, TX (US)

( * ) Notice: Subject to any disclaimer, the term of this patent is extended or adjusted under 35 U.S.C. 154(b) by 0 days.

(21) Appl. No.: 17/991,668

(22) Filed: Nov. 21, 2022

(65) Prior Publication Data
US 2023/0158447 A1    May 25, 2023

Related U.S. Application Data

(60) Provisional application No. 63/281,770, filed on Nov. 22, 2021.

(51) Int. Cl.
*B01D 53/14* (2006.01)

(52) U.S. Cl.
CPC ..... *B01D 53/1475* (2013.01); *B01D 53/1425* (2013.01); *B01D 2256/22* (2013.01); *B01D 2257/504* (2013.01); *B01D 2257/80* (2013.01)

(58) Field of Classification Search
None
See application file for complete search history.

(56) References Cited

U.S. PATENT DOCUMENTS

| 4,249,915 | A | | 2/1981 | Sircar et al. | |
|---|---|---|---|---|---|
| 5,681,360 | A | * | 10/1997 | Siwajek | C07C 7/005 95/149 |
| 6,048,509 | A | | 4/2000 | Kawai et al. | |
| 6,248,794 | B1 | | 6/2001 | Gieskes | |
| 7,632,476 | B2 | * | 12/2009 | Shah | C01B 32/50 423/220 |
| 8,263,372 | B2 | | 9/2012 | Oakley | |
| 9,102,534 | B2 | | 8/2015 | McKenna | |

(Continued)

FOREIGN PATENT DOCUMENTS

| EP | 2660326 B1 | 12/2018 |
|---|---|---|
| WO | WO2014/073004 A2 | 5/2014 |

(Continued)

OTHER PUBLICATIONS

IEAGHG Technical Report by IEA, Techno-Economic Evaluation of CO2 Capture in LNG Plants, IEA Greenhouse Gas R&D Programme, Oct. 2019, 198 pages.

(Continued)

*Primary Examiner* — Christopher P Jones
*Assistant Examiner* — Phillip Y Shao
(74) *Attorney, Agent, or Firm* — K&L Gates LLP

(57) ABSTRACT

Devices, systems, facilities, and methods for bio fermentation-based facilities, such as corn milling, ethanol, breweries, and biogas, are disclosed herein. The CO2 rich streams from the fermentation unit and the process heaters/boilers are sent to a sequestration site or pipeline via a capture unit and sequestration compressor, thereby reducing the overall emissions from the facility.

18 Claims, 3 Drawing Sheets

(56) References Cited

U.S. PATENT DOCUMENTS

| | | | |
|---|---|---|---|
| 9,149,761 | B2 | 10/2015 | Northrop et al. |
| 10,315,150 | B2 | 6/2019 | Huntington et al. |
| 10,898,846 | B1 | 1/2021 | Kolodji |
| 11,041,420 | B2 | 6/2021 | Williams et al. |
| 11,067,335 | B1 | 7/2021 | Van der Walt et al. |
| 11,112,174 | B1 | 9/2021 | Van der Walt et al. |
| 11,484,825 | B1 | 11/2022 | Heichelbech et al. |
| 2003/0192343 | A1 | 10/2003 | Wilding et al. |
| 2007/0254969 | A1* | 11/2007 | Olah .................. C07C 29/136 518/726 |
| 2010/0139484 | A1 | 6/2010 | Li et al. |
| 2010/0263385 | A1* | 10/2010 | Allam .................. C01B 3/384 422/187 |
| 2010/0317074 | A1* | 12/2010 | Simpson .................. C12P 7/08 435/140 |
| 2010/0325958 | A1 | 12/2010 | Molaison |
| 2014/0053565 | A1 | 2/2014 | Galasso et al. |
| 2014/0053761 | A1 | 2/2014 | Galasso |
| 2015/0078982 | A1* | 3/2015 | Noyes .................. B01J 23/745 423/447.3 |
| 2016/0059180 | A1 | 3/2016 | Hamad |
| 2016/0222774 | A1* | 8/2016 | Rhodes .................. C10G 1/04 |
| 2016/0369674 | A1 | 12/2016 | Younes et al. |
| 2017/0097189 | A1 | 4/2017 | Guy et al. |
| 2017/0158503 | A1* | 6/2017 | Foody .................. C10L 1/02 |
| 2017/0333814 | A1 | 11/2017 | Yancy et al. |
| 2018/0094560 | A1 | 4/2018 | Williams et al. |
| 2021/0121826 | A1 | 4/2021 | Kolodji |
| 2022/0065160 | A1 | 3/2022 | Van der Walt et al. |
| 2022/0305434 | A1 | 9/2022 | Van der Walt et al. |

FOREIGN PATENT DOCUMENTS

| | | |
|---|---|---|
| WO | WO2022/13197 A1 | 1/2022 |
| WO | WO2022/050918 A1 | 3/2022 |

OTHER PUBLICATIONS

Third Party Observation from PCT/US2020/051269, Filed Sep. 17, 2020, listing the IEAGHG Technical Report, 1 page.
Supplemental Explanation for Third Party Observation from PCT/US2020/051269, Filed Sep. 17, 2020, regarding the IEAGHG Technical Report, 4 pages.
Third Party Observation from PCT/US2021/046716, Filed Aug. 19, 2021, listing the IEAGHG Technical Report, 1 page.
Supplemental Explanation for Third Party Observation from PCT/US2021/046716, Filed Aug. 19, 2021, regarding the IEAGHG Technical Report, 3 pages.
International Preliminary Report on Patentability and Written Opinion from PCT/US2020/051269, dated Mar. 8, 2023, 16 pages.
International Preliminary Report on Patentability and Written Opinion from PCT/US2021/046817, dated Mar. 8, 2023, 4 pages.
International Preliminary Report on Patentability and Written Opinion from PCT/US2020/046879, dated Mar. 8, 2023, 7 pages.
Galitsky, et al., "Energy Efficiency Improvement and Cost Saving Opportunities for the Corn Wet Milling Industry," LBNL-52307 Energy Analysis Department, Environmental Energy Technology Division, Ernest Orlando Lawrence Berkeley National Laboratory, Jul. 2003, 90 pages, University of California, Berkeley, CA.
Saffy, et al., Core"Energy, Carbon Dioxide and Water Use Implications of Hydrous Ethanol Production," Department of Engineering, University of Cambridge, 2015, 18 pages, United Kingdom.
Sanchez, et al., "Near-term deployment of carbon capture and sequestration from biorefineries in the United States," PNAS, vol. 115, No. 19, Apr. 23, 2018, pp. 4875-4880, Department of Global Ecology, Carnegie Institution for Science, Stanford, CA.
International Preliminary Report on Patentability and Written Opinion from PCT/US2020/046879, dated Mar. 8, 2023, 6 pages.
International Search Report from PCT/US2023/15194, dated Jun. 15, 2023, 2 pages.
International Written Opinion from PCT/US2023/15194, dated Jun. 15, 2023, 4 pages.
International Search Report from PCT/US2023/15375, dated Jun. 14, 2023, 2 pages.
International Written Opinion from PCT/US2023/15375, dated Jun. 14, 2023, 6 pages.
International Search Report from PCT/US2022/53201, dated Mar. 27, 2023, 2 pages.
International Written Opinion from PCT/US2022/53201, dated Mar. 27, 2023, 4 pages.

* cited by examiner

DEVICES, SYSTEMS, FACILITIES AND PROCESSES FOR BIO FERMENTATION BASED FACILITIES

CROSS REFERENCE TO RELATED APPLICATIONS

The present application claims the benefit of priority to U.S. Provisional Application No. 63/281,770 filed Nov. 22, 2021, the entirety of which is incorporated herein by reference.

BACKGROUND

Manufacturing facilities such as corn milling, ethanol, and biogas plants contribute to greenhouse gases. Greenhouse gases comprise various gaseous components such as carbon dioxide, methane, nitrous oxide, hydrofluorocarbons, perfluorocarbons, and sulfur hexafluoride that absorb radiation, trap heat in the atmosphere, and generally contribute to undesirable environmental green-house effects.

These facilities often implement certain forms of hydrocarbon reduction technologies such as scrubbers. However, typically these facilities do not have a dedicated process specifically designed to reduce most greenhouse gas emissions.

Bio-fermentation based facilities and related processes need to improve the overall efficiency of the facility and reduce greenhouse gas emissions.

SUMMARY

In light of the disclosure herein, and without limiting the scope of the invention in any way, in a first aspect of the present disclosure, which may be combined with any other aspect listed herein unless specified otherwise, a bio fermentation facility includes a fermentation unit and process heaters/boilers which both generate greenhouses gases as a byproduct. The inlet to the fermentation unit is the hot or cooled mash which consists primarily of glucose.

In a second aspect of the present disclosure, which may be combined with any other aspect listed herein unless specified otherwise, the bio fermentation facility includes a gas conditioning unit to process the CO2 rich gas coming from the fermentation unit. A blower can be placed either upstream or downstream of this unit in order to send the gas to compression.

In a third aspect of the present disclosure, which may be combined with any other aspect listed herein unless specified otherwise, the flue gas from one or more process units, such as process heaters, may be released to the atmosphere.

In a fourth aspect of the present disclosure, which may be combined with any other aspect listed herein unless specified otherwise, the flue gas from the gas conditioning unit may be sent to a cooler to lower the temperature prior to compression.

In a fifth aspect of the present disclosure, which may be combined with any other aspect listed herein unless specified otherwise, the CO2 rich gas from the cooler may be sent to the sequestration compression unit, which may be gas, steam or electric driven. If the compressor is gas driven, the CO2 emissions from the gas turbine may be recycled to the plant inlet. If the compressor is steam driven, the steam will be consumed from the steam produced at the existing facility. The sequestration compressor may include a dehydration unit. The sequestration compression unit may be configured to compress and convey at least one CO2-rich stream towards a sequestration site, thereby reducing the overall emissions from the facility.

In a sixth aspect of the present disclosure, which may be combined with any other aspect listed herein unless specified otherwise, the flue gas from process units such as the process heaters/boilers are sent to a tie-in downstream of the cooler and upstream of the capture unit via a flue gas booster fan/blower which can be placed upstream or downstream of the gas/gas exchanger. The capture unit includes an absorber and a commercially available absorbing media for CO2 (amine, ammonia, ionic fluids, sodium carbonate, methanol, potassium chloride, and any other available industrial solvents) for absorbing CO2. This tie-in also includes the flue gas from the fermentation unit which is downstream of the gas conditioning unit and cooler.

In a seventh aspect of the present disclosure, which may be combined with any other aspect listed herein unless specified otherwise, the flue gas from the process/heaters is sent to a Waste Heat Recovery Unit (WHRU). The waste heat recovered in the form of a heating medium or steam may be sent to the reboiler of the capture unit.

In an eighth aspect of the present disclosure, which may be combined with any other aspect listed herein unless specified otherwise, the flue gas from the cooler is sent to a tie-in point that joins the flue gas from the process heaters/boilers. This joint stream is sent to the inlet of the capture unit. The capture unit includes an absorber and a commercially available absorbing media for CO2 (amine, ammonia, ionic fluids, sodium carbonate, methanol, potassium chloride, and any other available industrial solvents) for absorbing CO2. The steam from the existing facility is used for the regenerator reboiler in the capture unit.

In a ninth aspect of the present disclosure, which may be combined with any other aspect listed herein unless specified otherwise, the CO2 rich gas stream from the capture unit may be sent to the sequestration compression unit. The compressor of the sequestration compression unit may be gas, steam or electric driven. If the compressor is gas driven, the CO2 emissions may be recycled to the plant inlet and/or to the capture unit. If the compressor is steam driven, the steam may be consumed from the steam produced at the existing facility. The sequestration compressor may include a dehydration unit. The sequestration compression unit may be configured to compress and convey at least one CO2-rich stream towards a sequestration site, thereby reducing the overall emissions from the facility.

In a tenth aspect of the present disclosure, which may be combined with any other aspect listed herein unless specified otherwise, the flue gas from the process heaters/boilers are sent directly to the capture unit via a flue gas blower and then to a gas-gas exchanger for cooling. The capture unit includes a commercially available absorbing media for CO2 (amine, ammonia, ionic fluids, sodium carbonate, methanol, potassium chloride, and any other industrially available solvents) and an absorber for absorbing CO2. The steam from the existing facility can be used for the regenerator reboiler, and/or steam/heat generated from the Waste Heat Recovery Unit (WHRU). The treated CO2 rich stream is sent to a tie-in point downstream of the cooler and upstream of the sequestration compression unit. The flue gas from the fermentation unit is sent to the gas conditioning unit and cooler as described in the seventh and eighth aspects.

In an eleventh aspect of the present disclosure, which may be combined with any other aspect listed herein unless specified otherwise, the CO2 gas from the sequestration compression unit is sent to sequestration. The sequestration compression unit is configured to compress and convey at least one CO2-rich stream towards a sequestration site, thereby reducing the overall emissions from facility.

In a twelfth aspect of the present disclosure, which may be combined with any other aspect listed herein unless specified otherwise, the sequestration site comprises an underground land based geological formation.

In a thirteenth aspect of the present disclosure, which may be combined with any other aspect listed herein unless specified otherwise, the sequestration site comprises a region below a seabed.

In a fourteenth aspect of the present disclosure, which may be combined with any other aspect listed herein unless specified otherwise, the sequestration site comprises a region located at a depth greater than about 3.0 kilometers below sea level.

In a fifteenth aspect of the present disclosure, which may be combined with any other aspect listed herein unless specified otherwise, the sequestration site comprises a geological formation containing a saline aquifer below a seabed.

In a sixteenth aspect of the present disclosure, which may be combined with any other aspect listed herein unless specified otherwise, the sequestration site comprises a geological formation containing a saline aquifer below a seabed.

In a seventeenth aspect of the present disclosure, which may be combined with any other aspect listed herein unless specified otherwise, the sequestration site comprises an off-site underground geological formation comprising an at least partially depleted hydrocarbon reservoir (Enhanced Oil Recovery).

In an eighteenth aspect of the present disclosure, which may be combined with any other aspect listed herein unless specified otherwise, the sequestration site comprises a pipeline for transporting a CO2 rich stream to other industrial users.

In a nineteenth aspect of the present disclosure, which may be combined with any other aspect listed herein unless specified otherwise, the sequestration site comprises of CO2 storage tanks to be sent to aggregate, to be sent to syngas production, and/or to be used for power production. For power production, the liquid CO2 which is stored can act as a "peak shaving" facility and evaporate the liquid CO2 as power is required. This liquid CO2 is expanded into gas to drive a set of turbines to generate electricity. The gas is returned to a dome to be stored and compressed into liquid to start the cycle again.

Additional features and advantages of the disclosed devices, systems, and methods are described in and will be apparent from the following Detailed Description and the Figures. The features and advantages described herein are not all-inclusive and in particular many additional features and advantages will be apparent to one of ordinary skill in the art in view of the figures and description. Also, any particular embodiment does not have to have all of the advantages listed herein. Moreover, it should be noted that the language used in the specification has been principally selected for readability and instructional purposes, and not to limit the scope of the inventive subject matter.

BRIEF DESCRIPTION OF THE FIGURES

Understanding that the figures depict only typical embodiments of the invention and are not to be considered to be limiting the scope of the present disclosure, the present disclosure is described and explained with additional specificity and detail through the use of the accompanying figures. The figures are listed below.

DETAILED DESCRIPTION OF EXAMPLE EMBODIMENTS

The detailed description is to be construed as exemplary only and does not describe every possible embodiment, as describing every possible embodiment would be impractical, if not impossible. One of ordinary skill in the art could implement numerous alternate embodiments, which would still fall within the scope of the claims. To the extent that any term is referred to in a manner consistent with a single meaning, that is done for the sake of clarity and illustration only, and it is not intended that such claim term be limited to that single meaning.

Figure 1:
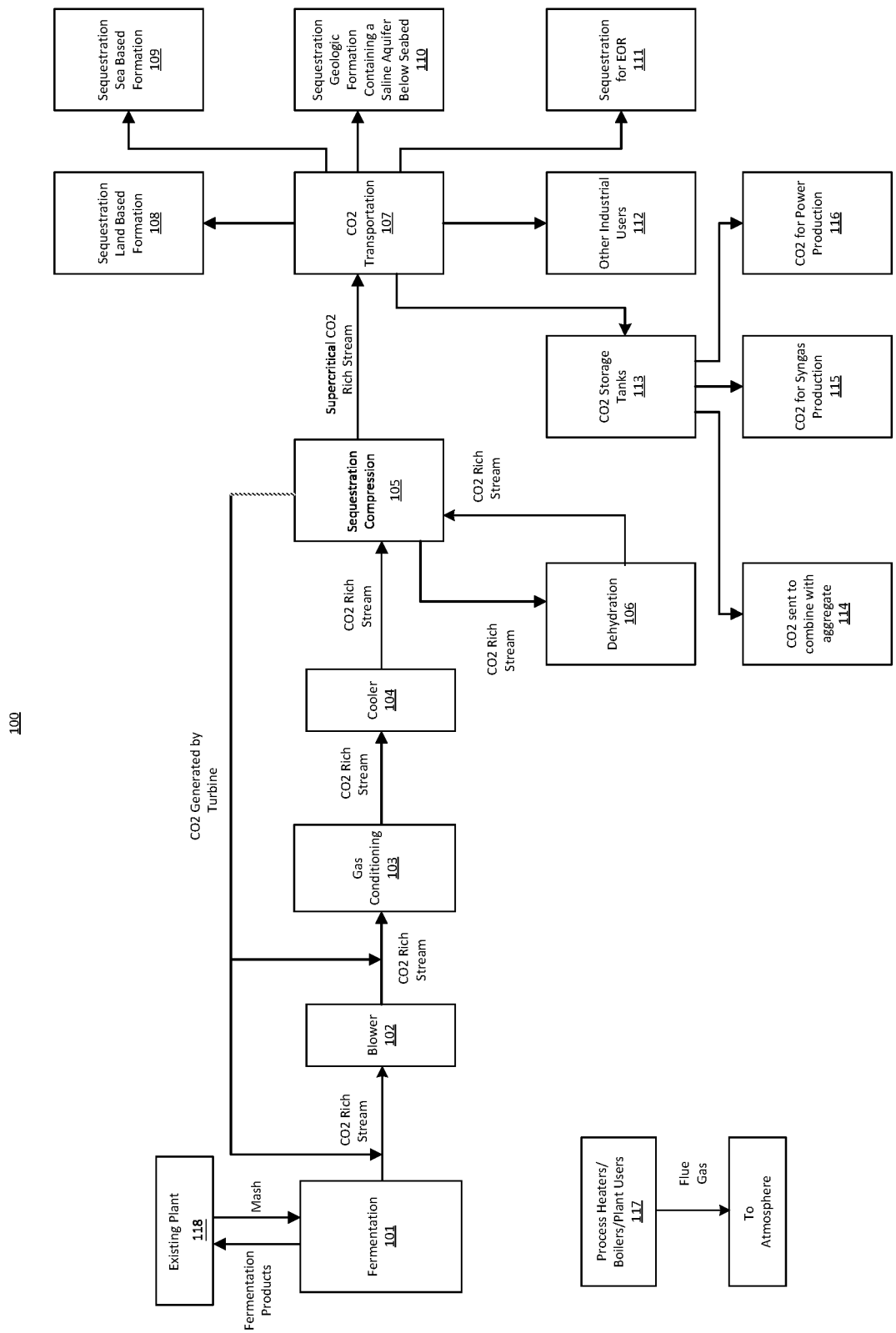
FIG. 1 illustrates an exemplary schematic of a bio fermentation-based facility with the flue gas from the fermentation unit being sent to sequestration and the flue gas from the process heaters being sent to atmosphere.

Referring now to the figures, FIG. 1 illustrates an exemplary schematic of a bio fermentation-based facility 100 with the flue gas from the fermentation unit 101 being sent to sequestration and the flue gas from the process heaters 117 being sent to atmosphere. An existing plant 118 sends hot or cooled mash to the fermentation unit 101, where yeast may be introduced. In the fermentation unit 101, the mash may undergo a batch process that can take between 40-50 hours. A high concentration CO2 may be generated from this reaction. The rich CO2 flue gas stream from the fermentation unit 101 may be sent to the blower 102 and then sent to the gas conditioning unit 103 to condition the rich CO2 gas from the fermentation unit 101. Once this gas has been conditioned in order to provide the CO2 quality required for the CO2 pipeline and sequestration, this stream may be sent to a cooler 104 to be cooled in preparation for compression. For example, the cooler 104 may lower the temperature of the CO2 gas stream to assist in removing water to prepare the stream for compression.

The CO2 rich stream from the cooler 104 may be sent to the sequestration compression unit 105. The sequestration compression unit 105 may include one or more knockout drums for collecting any remaining liquid in the gas stream. The sequestration compression unit 105 may further include at least one compressor configured to compress the carbon dioxide rich stream. Within the stages of the sequestration compression is a dehydration unit 106 (i.e TEG, molecular sieve) which may remove additional water to meet the sequestration specifications. The sequestration compression unit 105 can be designed to achieve a 50% turndown capacity while still sequestering the full amount of CO2.

The dry CO2 stream may then be sent from the sequestration compression unit 105 to transportation 107. This can include for example sending the CO2 rich gas to an on-site or off-site storage tank 113, to a tank mounted on a rail car, or a tank mounted on a truck-drawn trailer. The CO2 can be sent to a sequestration site, such as a sequestration site that is underneath a land-based formation 108, a sequestration site that is underneath a sea-based formation 109, or a sequestration site that is a geological formation that contains a saline aquifer below the seabed 110. In some related embodiments, the sequestration site may be a region below a seabed, wherein the seabed can be located at a depth greater than about 3.0 kilometers below sea level. In some related embodiments, the transferred carbon dioxide rich stream may be injectable into a partially depleted hydrocarbon reservoir to aid in enhanced oil recovery 111. In some related embodiments, the transferred carbon dioxide rich stream can be sent as raw material for other industrial users 112. In some related embodiments, the transferred carbon dioxide rich stream can be sent to liquid CO2 storage tanks 113, to be combined with aggregate 114, to be used in syngas production 115, and/or to be used in power production 116. For power production, the liquid CO2 which is stored can act as a "peak shaving" facility and evaporate the liquid CO2 as power is required. For example, this liquid CO2 may be expanded into gas to drive a set of turbines to generate electricity. The gas is returned to a dome to be stored and compressed into liquid to start the cycle again.

In some embodiments, the sequestration compression unit 105 may include a compressor that may be driven by existing steam generated from the existing plant 118, a gas turbine, and/or an electric motor. Excess CO2 from the sequestration compression unit 105 is recycled and sent upstream of the blower 102. Liquids from the knockout drums within sequestration compression units 105 may be sent back to the existing plant 118 to be stored or disposed of safely.

By sending the carbon dioxide rich stream to some form of sequestration, overall greenhouse gas emissions from facility 100 can be reduced. The flue gas from process units such as the process heaters and boilers 117 may be sent to the atmosphere as per the status quo.

The bio fermentation-based facility 100 may also include ancillary heating equipment running full time to support the heating requirements of the carbon capture facility. The ancillary heating equipment can be provided to handle about 0-50% turndown with a low capture yield and a fast response on increased capture rate when the system is ramped up.

Figure 2:
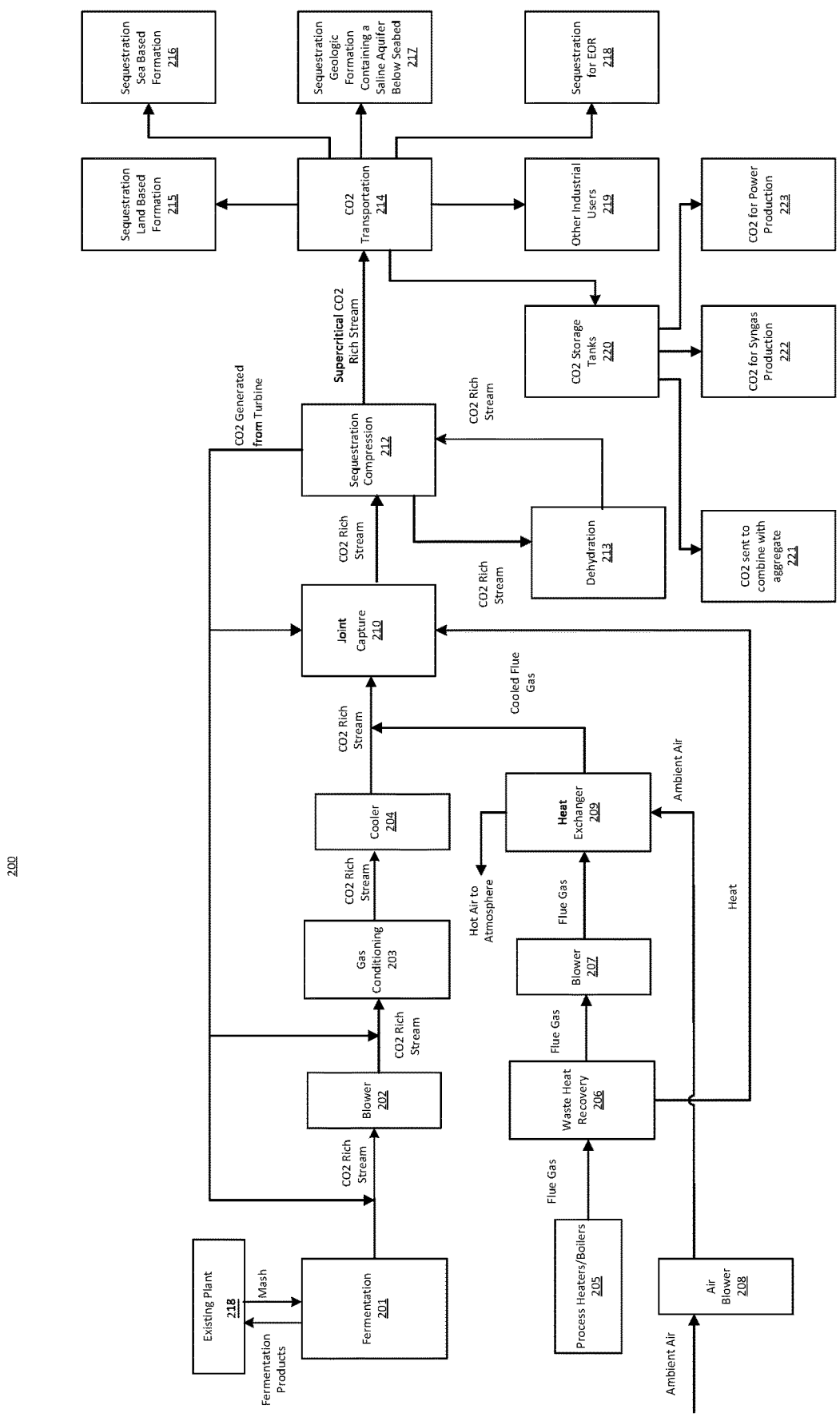
FIG. 2 illustrates an exemplary schematic of a bio fermentation-based facility with the flue gas from the fermentation unit and the flue gas from the process heater being sent to the capture unit before being sent to sequestration.

FIG. 2 illustrates an exemplary schematic of a bio fermentation-based facility 200 with the flue gas from the fermentation unit being sent to a joint capture unit with the flue gas from the process heaters/boilers. The joint stream is processed and sent to sequestration.

The existing plant 224 may send the hot or cooled mash to the fermentation unit 201, where yeast is introduced. The mash may undergoes a batch process in the fermentation unit 201 that may take about 40-50 hours. The high concentration CO2 may be generated from this reaction.

The rich CO2 stream from the fermentation unit 201 may be sent to the blower 202 and then sent to the gas conditioning unit 203 to condition the rich CO2 gas from the fermentation unit 201. Once this gas has been conditioned, this stream is sent to a cooler 204 to be cooled in preparation for capture.

The flue gas from the process units such as process heaters, boilers and other plant users 205 may be sent to a waste heat recovery unit 206 to generate heat and/or steam to be sent to the regenerator reboiler in the capture unit 210. The cooled flue gas may be sent to a flue gas blower 207 and then sent to the heat exchanger 209 to be cooled further. The flue gas blower 207 can be located upstream or downstream of the heat exchanger 209. In some embodiments, the heat exchanger 209 may be a gas/gas heat exchanger, and the cooling medium may be ambient air, which can be sent to the gas/gas exchanger from an air blower 208 that is upstream of the gas/gas exchanger 209. In some embodiments, the heat exchanger may be a direct contact cooler utilizing water as the cooling medium for the flue gas.

The cooled flue gas may be joined with the cooled fermentation CO2 downstream of the cooler 204 before being sent to the joint capture unit 210. The joint capture unit 210 may include an absorber and a commercially available absorbing media for CO2 to absorb CO2. Examples of absorbing media include amine, ammonia, ionic fluids, sodium carbonate, methanol, potassium chloride, and any other available industrial solvents. The capture unit 210 can be designed to achieve 50% turndown capacity whilst still achieving a 95% capture rate. The rich CO2 stream may be sent from the joint capture unit 210 to the sequestration compressor 212.

In some embodiments, the sequestration compressor 212 may be a gas driven compressor, and the CO2 from the gas driven compressor can be used as feedstock to create an additional flue gas stream, which may then be sent to the absorber in the capture unit 210. Alternatively or additionally, the additional flu gas stream may be sent to an inlet upstream of the blower 202 and/or an inlet upstream of the gas conditioning unit 203. If the compressor is instead a steam or electric driven compressor, then there will be no CO2 emissions from the compressor. Within the sequestration compressor 212, there may be a dehydration unit 213 that the CO2 rich stream is sent to be dehydrated further and then sent back to the sequestration compressor 212 to be further compressed. The sequestration compression unit 212 can be designed to achieve a 50% turndown capacity while still sequestering the full amount of CO2.

The compressed gas may be sent to be transported though pipeline, truck, rail, or any other commercially feasible methods 214 and sequestered. In some embodiments, the sequestration compression unit 212 may include a compressor that is driven by existing steam generated from the existing plant 224 or by an electric motor. Liquids from the knockout drums within the sequestration compression units 212 may be sent back to the existing plant 224 to be stored or disposed of via truck.

In some embodiments, the CO2 stream can be sequestered in a land-based formation 215, a sea based formation 216, in a geological formation containing a saline aquifer below a seabed, and/or be used for enhanced oil recovery (EOR) 218 in a partially depleted hydrocarbon reservoir. In some embodiments, the sequestration site may be a region on top of a seabed, at a depth greater than three kilometers below sea level. In some embodiments, the sequestration site may be a region below a seabed. In some embodiments, the sequestration site may be a region below a seabed, wherein the seabed is located at a depth greater than about 3.0 kilometers below sea level.

In some embodiments, the transferred carbon dioxide rich stream can be sent as raw material for other industrial users 219 and/or to liquid CO2 storage tanks 220 to be combined with aggregate 221, to be used in syngas production 222, and/or to be used in power production 223. For power production, the liquid CO2 which is stored can act as a "peak shaving" facility and evaporate the liquid CO2 as power is required. This liquid CO2 is expanded into gas to drive a set of turbines to generate electricity. The gas is returned to a dome to be stored and compressed into liquid to start the cycle again.

The bio fermentation-based facility 200 may also include ancillary heating equipment running full time to support the heating requirements of the carbon capture facility. The ancillary heating equipment may be provided to handle about 0-50% turndown with a low capture yield and a fast response on increased capture rate when the system is ramped up.

Figure 3:
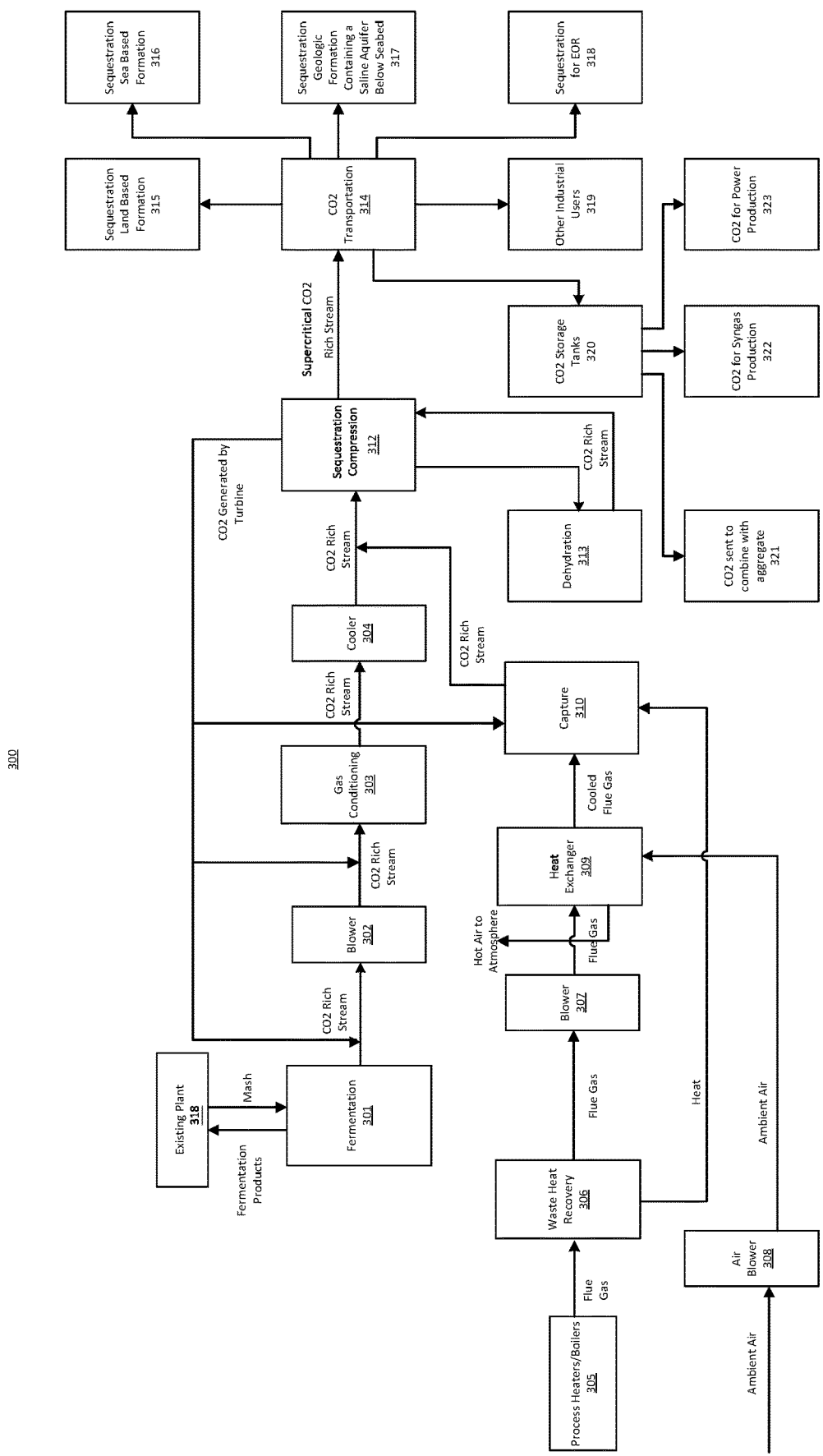
FIG. 3 illustrates an exemplary schematic of a bio fermentation-based facility with the flue gas from the fermentation unit being sent to sequestration and the flue gas from the process heaters being sent to the capture unit before combining with the fermentation flue gas, upstream of the sequestration compression unit.

FIG. 3 illustrates an exemplary schematic of a bio fermentation-based facility 300 with the flue gas from the fermentation unit being sent to a joint capture unit with the flue gas from the process heaters/boilers. The joint stream is processed and sent to sequestration.

The existing plant 324 may send the hot or cooled mash to the fermentation unit 301, where yeast may be introduced. The mash may undergo a batch process in the fermentation unit 301 that may take from about 40 to about 50 hours. The high concentration CO2 may be generated from this reaction.

The rich CO2 stream from the fermentation unit 301 may be sent to the blower 302 and then sent to the gas conditioning unit 303 to condition the rich CO2 gas from the fermentation unit 301. Once this gas has been conditioned, this stream may be sent to a cooler 304 to be cooled in preparation for compression.

The flue gas from the process units such as process heaters, boilers and other plant users 305 may be sent to a waste heat recovery unit 306 to generate heat and/or steam to be sent to the regenerator reboiler in the capture unit 310. The cooled flue gas may be sent to a flue gas blower 307 and then sent to the heat exchanger 309 to be cooled further. The flue gas blower 307 can be located upstream or downstream of the heat exchanger 309. In some embodiments, the heat exchanger 309 may be a gas/gas heat exchanger, and the cooling medium may be ambient air, which can be sent to the gas/gas exchanger from an air blower 308 that is upstream of the gas/gas exchanger 309. In some embodiments, the heat exchanger 309 may be a direct contact cooler utilizing water as the cooling medium for the flue gas. The cooled flue gas may then be sent to the capture unit 310.

The capture unit 310 may include an absorber and a commercially available absorbing media for CO2 to absorb CO2. Examples of absorbing media include amine, ammonia, ionic fluids, sodium carbonate, methanol, potassium chloride, and any other available industrial solvents. The capture unit 310 is designed to achieve 50% turndown capacity whilst still achieving a 95% capture rate. The rich CO2 stream may be joined with the CO2 stream downstream of the cooler 304 before being sent to the sequestration compressor 312. In some embodiments, the compressor in the sequestration compressor 312 may be a gas driven compressor, and the flue gas from the gas driven compressor may then be sent to the absorber in the capture unit 310. Alternatively or additionally, the additional flu gas stream may be sent to an inlet upstream of the blower 302 and/or an inlet upstream of the gas conditioning unit 303. If this is a steam or electric driven compressor then there will be no CO2 emissions from the compressor.

Within the sequestration compressor unit 312, there may be a dehydration unit 313 to which the CO2 rich stream may be sent to be dehydrated further, and then the dehydrated CO2 rich stream may be sent back to the sequestration compressor 312 to be further compressed. In some embodiments, the sequestration compression unit 312 may include a compressor that may be driven by existing steam generated from the existing plant 324 or by an electric motor. Liquids from the knockout drums within sequestration compression units 312 may be sent back to the facility to be stored or disposed of via truck. Once compressed, this gas may be sent to be transported though pipeline, truck, rail, or any other commercially feasible methods 314 and sequestered. The sequestration compression unit 312 can be designed to achieve a 50% turndown capacity while still sequestering the full amount of CO2.

In some embodiments, the CO2 stream can be sequestered in a land-based formation 315, a sea based formation 316, in a geological formation containing a saline aquifer below a seabed, and/or be used for enhanced oil recovery (EOR) 318 in a partially depleted hydrocarbon reservoir. In some embodiments, the sequestration site may be a region on top of a seabed, at a depth greater than three kilometers below sea level. In another embodiment, the sequestration site is a region below a seabed. In some embodiments, the sequestration site may be a region below a seabed, wherein the seabed is located at a depth greater than about 3.0 kilometers below sea level.

In some embodiments, the transferred carbon dioxide rich stream can be sent as raw material for other industrial users 319. In some embodiments, the transferred carbon dioxide rich stream can be sent to liquid CO2 storage tanks 320 to be combined with aggregate 321, to be used in syngas production 322, and/or to be used in power production 323. For power production, the liquid CO2 which is stored can act as a "peak shaving" facility and evaporate the liquid CO2 as power is required. This liquid CO2 may be expanded into gas to drive a set of turbines to generate electricity. The gas may be returned to a dome to be stored and compressed into liquid to start the cycle again.

The bio fermentation-based facility 300 may also include ancillary heating equipment running full time to support the heating requirements of the carbon capture facility. The ancillary heating equipment can be provided to handle 0-50% turndown with a low capture yield and a fast response on increased capture rate when the system is ramped up.

As used in this specification, including the claims, the term "and/or" is a conjunction that is either inclusive or exclusive. Accordingly, the term "and/or" either signifies that one selection may be made from a group of alternatives.

The many features and advantages of the present disclosure are apparent from the written description, and thus, the appended claims are intended to cover all such features and advantages of disclosure. Further, since numerous modification and changes will readily occur to those skilled in the art, the present disclosure is not limited to the exact construction and operation as illustrated and described. Therefore, the described embodiments should be taken as illustrative and not restrictive, and the disclosure should not be limited to the details given herein but should be defined by the following claims and their full scope of equivalents, whether foreseeable or unforeseeable no or in the future.

We claim:

1. A system for treating, compressing, and sequestering various CO2 streams from a bio fermentation based facility, the system comprising:
   a fermentation stream gas blower configured to move a CO2 gas stream from a fermentation unit to a gas conditioning unit and a cooler;
   the gas conditioning unit configured to condition the CO2 gas stream from the fermentation unit;
   a cooler configured to lower a temperature of the CO2 gas stream to assist in removing water and preparing the CO2 gas stream for compression;
   a sequestration compression unit configured to compress the CO2 gas stream and convey the compressed CO2 gas stream towards at least one of a sequestration site, a storage tank, or at least one industrial user, the sequestration compression unit comprising a sequestration compressor and a dehydration unit;

a waste heat recovery unit configured to capture heat from flue gas of one or more process units and direct a heating medium or steam towards a capture unit;

a process units flue gas blower configured to move a flue gas from the one or more process units to the capture unit;

a gas-gas exchanger configured to cool the flue gas from the one or more process units before the flue gas enters the capture unit; and an air blower configured to blow ambient air through to the gas-gas exchanger for cooling; and the capture unit is configured to capture the CO2 from the flue gas of the one or more process units, the capture unit including a CO2 absorber and a liquid absorbent for absorbing CO2 from the flue gas.

2. The system of claim 1, wherein the capture unit is configured to process both the CO2 gas stream from the fermentation unit and the flue gas from the one or more process units before directing a combined gas stream to the sequestration compression unit.

3. The system of claim 1, wherein the process units flue gas blower is located upstream of the gas-gas exchanger.

4. The system of claim 1, wherein the process units flue gas blower is located downstream of the gas-gas exchanger.

5. The system of claim 1, wherein the sequestration site is selected from the group consisting of a region below a sea based formation, a region in a geological formation containing a saline aquifer below the sea based formation, a partially depleted hydrocarbon reservoir for enhanced oil recovery, and combinations thereof.

6. The system of claim 1, wherein the sequestration compressor of the sequestration compression unit is gas driven, and the sequestration compression unit is configured to direct emitted CO2 from the sequestration compressor to the fermentation gas blower.

7. The system of claim 1, further comprising ancillary heating equipment configured to support heating requirements of the bio fermentation based facility.

8. A process for treating, compressing, and sequestering various CO2 streams from a bio fermentation based facility, the process comprising:

directing, by a fermentation stream gas blower, a CO2 gas stream from a fermentation unit to a gas conditioning unit and a cooler;

conditioning, by the gas conditioning unit, the CO2 gas stream;

cooling, by the cooler, the CO2 gas stream;

compressing, by a sequestration compression unit, the CO2 gas stream into a compressed CO2 gas stream, the sequestration compression unit comprising a sequestration compressor and a dehydration unit; and conveying, by the sequestration compression unit, the compressed CO2 gas stream towards at least one of a sequestration site, a storage tank, or at least one industrial user;

capturing, by a waste heat recovery unit, heat from a flue gas of one or more process units and directing a heating medium or steam towards a capture unit;

directing, by a process units flue gas blower, the flue gas from the one or more process units towards the capture unit;

cooling, by a gas-gas exchanger, the flue gas from the one or more process units before the flue gas enters the capture unit;

capturing, by the capture unit, the CO2 from the flue gas of the one or more process units.

9. The process of claim 8 comprising releasing the flue gas from the one or more process units to the atmosphere.

10. The process of claim 8, further comprising capturing, by the capture unit, CO2 from the CO2 gas stream from the fermentation unit.

11. The process of claim 10, further comprising processing, by the capture unit, both the CO2 gas stream from the fermentation unit and the flue gas from the one or more process units before directing a combined gas stream to the sequestration compression unit.

12. The process of claim 8, further comprising directing additional flue gas generated by the sequestration compressor to the fermentation stream gas blower.

13. The process of claim 8 comprising conveying the compressed CO2 gas stream to at least one industrial user, and the at least one industrial user uses the compressed CO2 gas stream as feedstock.

14. The process of claim 8 comprising conveying the compressed CO2 gas stream to a storage tank, transporting the compressed CO2 gas stream from the storage tank to be combined with aggregate CO2 from other sources to form a combined CO2 stream, and using the combined CO2 stream in syngas production and/or in power production.

15. The process of claim 8, wherein the sequestration compressor of the sequestration compression unit is gas driven, and the process comprises directing emitted CO2 from the sequestration compressor to the fermentation gas blower.

16. The process of claim 8, wherein the process units flue gas blower is located upstream of the gas-gas exchanger.

17. The process of claim 8, wherein the process units flue gas blower is located downstream of the gas-gas exchanger.

18. The process of claim 8, wherein the sequestration site is selected from the group consisting of a region below a sea based formation, a region in a geological formation containing a saline aquifer below the sea based formation, a partially depleted hydrocarbon reservoir for enhanced oil recovery, and combinations thereof.

* * * * *